United States Patent [19]

Ohnishi et al.

[11] Patent Number: 4,720,855
[45] Date of Patent: Jan. 19, 1988

[54] TELEPHONE APPARATUS

[75] Inventors: Kanji Ohnishi, Tokyo; Hiroshi Yasuda, Kanagawa; Norio Numata, Tokyo, all of Japan

[73] Assignee: Sony Corporation, Tokyo, Japan

[21] Appl. No.: 831,283

[22] Filed: Feb. 20, 1986

[30] Foreign Application Priority Data

Feb. 21, 1985 [JP] Japan .................................. 60-33322

[51] Int. Cl.⁴ ............................................ H04M 1/26
[52] U.S. Cl. .................................... 379/354; 379/355; 379/361
[58] Field of Search ........... 179/90 B, 90 BB, 90 BD, 179/81 E, 84 VF, 84 R, 81 R, 2 EA, 1.15 M, 2 E, 2 EB; 340/311.1; 379/354, 355, 356, 361, 370

[56] References Cited

U.S. PATENT DOCUMENTS

| | | | |
|---|---|---|---|
| 4,122,304 | 10/1978 | Millien, II .......................... | 179/90 B |
| 4,431,870 | 2/1984 | May et al. ......................... | 179/90 BB |
| 4,503,291 | 3/1985 | Von Holten et al. .......... | 179/90 AN |
| 4,535,200 | 8/1985 | Himmelbauer et al. ......... | 179/2 EA |

Primary Examiner—Thomas W. Brown
Assistant Examiner—Matthew Connors
Attorney, Agent, or Firm—Ronald P. Kananen

[57] ABSTRACT

In a telephone apparatus used for a telephone system such that the telephone set is connected to a remote destination telephone set through telephone circuits after an ID number of a subscriber has been transmitted to the telephone company, the handset comprises a key entry section including plural dial keys, a memory section for storing the ID number and destination telephone numbers, a display section for displaying a destination telephone number corresponding to an operated dial key, and a control section for enabling a display of the ID number when the ID number is written but disabling a display of the ID number when read. Since the ID number is not displayed while being read to transmit it to the telephone company, the ID number of the subscriber is kept secret from others.

3 Claims, 6 Drawing Figures

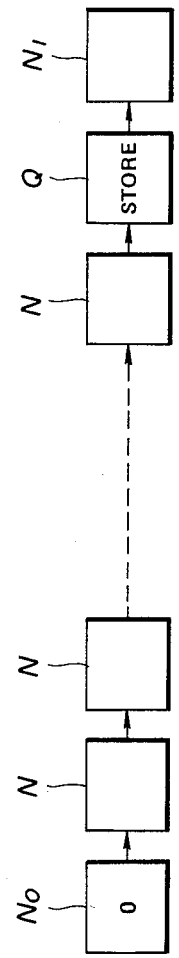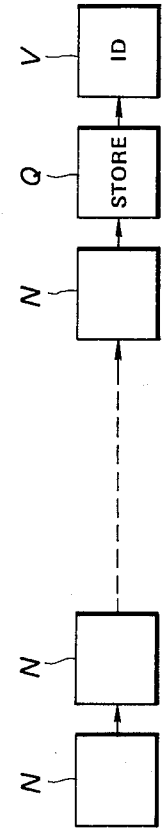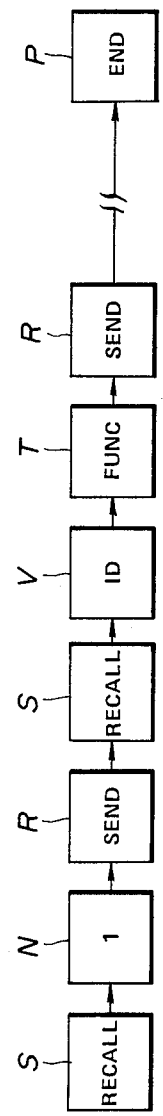
FIG.2A
FIG.2B
FIG.2C

TELEPHONE APPARATUS

BACKGROUND OF THE INVENTION

1. Field of the Invention

The present invention relates to a telephone apparatus used for a telephone system in which the telephone apparatus is connected to a remote destination telephone through telephone circuits after a subscriber's identification number (ID number) has been transmitted to the telephone company. In the telephone apparatus of the above type, the ID number (being recited) and the destination telephone number (being dialed) are usually written in a memory for registration and read from the memory for transmission to the telephone company.

2. Description of the Prior Art

In the United States of America, for instance, it is possible to pay a telephone charge of an automotive telephone set through a system referred to as "Calling Card" or "Card Call". In this system, the telephone company can demand payment from a telephone subscriber in a lump after having checked all the telephone charges. In more detail, when a subscriber operates push buttons or dial keys arranged on the automotive telephone set to enter a name of the telephone company, a remote destination telephone number and an ID number of the subscriber himself, the signals representative of the entered data are transmitted by air to the telephone company. When the subscriber is determined to be registered, the telephone circuits are connected between the telephone set specified by the ID number and another remote destination telephone set to be dialed and the resultant telephone charge is calculated. In these systems, however, it is very troublesome to enter a destination telephone number of ten digits and an ID number of fourteen digits, for instance, whenever the subscriber wants to call someone. Therefore, the destination telephone numbers and the ID number are usually stored in a memory unit of the telephone set by use of dial keys and a STORE key. Once these telephone numbers and the ID number are stored, since it is possible to read these data whenever necessary by simply operating the dial key or other keys two to four times, the operation of the telephone set is markedly simplified without entering the multi-digit numbers each time the subscriber calls someone.

In the above system, however, there still exist shortcomings. The basic problem is that another person near the subscriber might observe the ID number displayed on the display unit of the telephone set and use the ID number for a wrongful purpose without permission from the subscriber. This is because the ID number and/or a destination telephone number of many digits are displayed on the display unit of the set whenever these numbers are stored for registration or read for calling someone. In addition, when the telephone set is used, the ID number is not only displayed but converted into a DTMF (Dual Tone Multi-Frequency) signal for transmission of the ID number to the telephone company. Since the DTMF signal is reproduced into sound corresponding to the signal through a speaker of the subscriber's telephone set, another person near the subscriber's telephone set might hear and decode the DTMF signal for an unauthorized purpose.

SUMMARY OF THE INVENTION

It is thus the primary object of the present invention to provide a telephone apparatus in which the ID number of a subscriber is not displayed for keeping the ID number secret from another person, whenever the telephone apparatus is operated to call someone and therefore the ID number is read from the memory unit for transmission thereof to the telephone company.

To achieve the above-mentioned object and other objects apparent from the description, in a telephone apparatus used for a telephone system in which the telephone apparatus is connected to a remote destination telephone through telephone circuits after an identification number of a subscriber has been transmitted to a telephone company, the apparatus according to the present invention comprises: (a) key entry means including plural dial keys; (b) memory means for storing the identification number and a plurality of remote destination telephone numbers, both of which are entered through the dial keys; (c) display means for displaying a remote destination telephone number corresponding to an operated dial key; and (d) control means for enabling a display of the identification number on said displaying means when the identification number is written at a designated address of said memory means, but disabling a display of the identification number on said displaying means when the identification number is read from the designated address of said memory means to transmit the number to the telephone company.

A method for achieving the foregoing and other objects is also disclosed.

In the above telephone apparatus, when an ID number is stored for registration, the ID number is displayed so that the user can cofirm each entered digit. However, when the ID number is read, the ID number is not displayed so that the user can keep the ID number secret from other persons.

BRIEF DESCRIPTION OF THE DRAWINGS

The features and advantages of the telephone apparatus according to the present invention will be more clearly appreciated from the following description taken in conjunction with the accompanying drawings in which:

FIGS. 2A to 2C are diagrams for assistance in explaining the operating procedure of keys used with the apparatus according to the present invention.

DETAILED DESCRIPTION OF THE PREFERRED EMBODIMENTS

Figure 1:
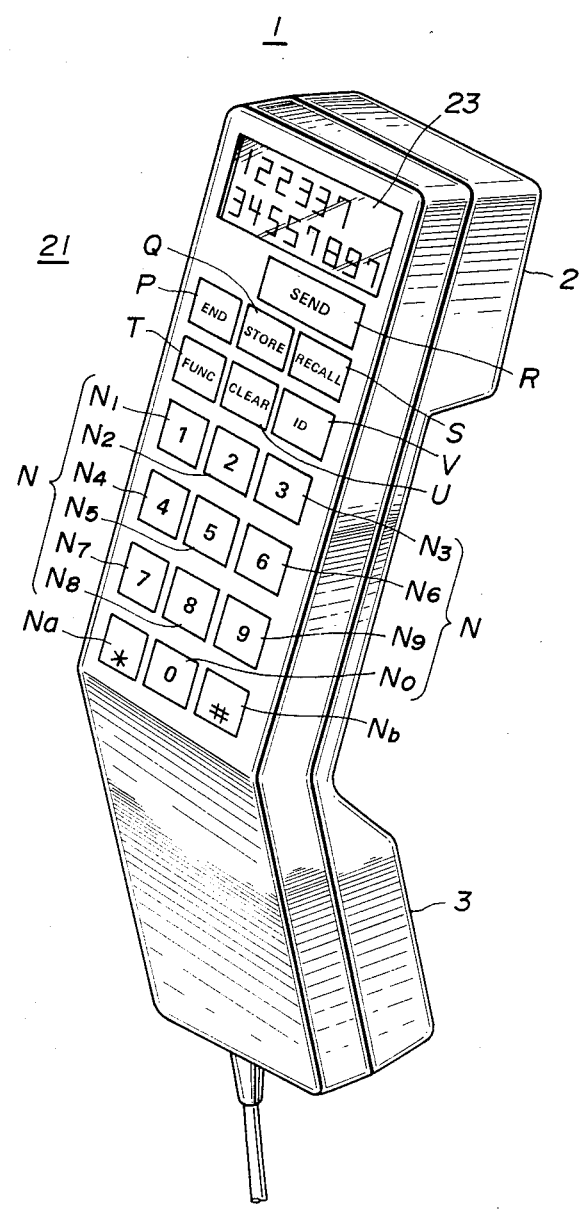
FIG. 1 is a perspective view of a handset of the telephone apparatus of the present invention for assistance in explaining one embodiment thereof.

The present invention will be described with reference to the attached drawings. The telephone apparatus according to the present invention includes a handset 1 as shown in FIG. 1. The handset 1 is provided with a speaker 2 and a microphone 3 on one side thereof and with a key entry section 21 and a display section 23. The key entry section 21 includes a set of dial keys N having a digit key $N_1$ of "1", a digit key $N_2$ of "2", a digit key $N_3$ of "3", a digit key $N_4$ of "4", a digit key $N_5$ of "5", a digit key $N_6$ of "6", a digit key $N_7$ of "7", a digit key $N_8$ of "8", a digit key $N_9$ of "9" and a digit key $N_O$ of "0", which correspond to digits from "1" to "9", and "0" in dial numbers. In addition, the key entry section 21 includes a "*" marked key Na, a "#" marked key $N_b$ and "END" key P, a "STORE" key Q, a "SEND" key R, a "RECALL" key S, a "FUNCTION" key T, a "CLEAR" key U, and an "ID" key V, respectively, arranged in order.

The operation procedure of writing/reading telephone numbers by use of these keys arranged in the key entry section 21 will be described hereinbelow taking the case where the apparatus is applied to the ATT (American Telephone and Telegraph Company) system, by way of example.

For instance, when a remote destination telephone number of ten digits for a first person A is required to be stored, first the digit key $N_o$ of "0" is depressed; then the destination telephone number of ten digits is entered by depressing the corresponding digit keys N in sequence; the "STORE" key Q is depressed; and lastly the digit key $N_1$ of "1" is depressed, as shown in FIG. 2A. As a result, the destination telephone number of the first person A is stored at a memory area of an address No. 1 corresponding to the lastly depressed digit key of "1". In this storing process, the telephone number for the first person A is displayed on the display section 23, so that the user can confirm each digit to be entered. Another remote destination telephone number for a second person B can be stored in the same way. When the digit key $N_2$ of "2" is depressed lastly, the telephone number for the second person B is stored at another memory area of an address No. 2 corresponding to the lastly depressed digit key $N_2$ of "2". In this case, the telephone number for the second person B is displayed on the display section 23 in place of the telephone number for the first person A.

The subscriber's ID (identification) number can be stored in the memory in accordance with the procedure as shown in FIG. 2B. That is, an ID number of, for example, fourteen digits is entered by depressing the digit number keys N in sequence; the "STORE" key Q is depressed; and lastly the "ID" key V is depressed. As a result, the ID number is stored at a memory area corresponding to the lastly depressed ID key V. In this process, the ID number is usually displayed in the display section 23. However, if required, the displayed ID number can be deleted by depressing the "CLEAR" key U.

The subscriber can call the first person A in accordance with the procedure as shown in FIG. 2C. That is, the "RECALL" key S is depressed; and then the digit key $N_1$ of "1" is depressed. The destination telephone number for the first person A (previously stored at memory address "1") is read out and displayed in the display section 23. Here, if the "SEND" key R is depressed, the coded data corresponding to the telephone number for the first person A are transmitted to the telephone company (i.e. ATT). Further, when the "RECALL" key S is depressed and then the "ID" key V is depressed, the ID number is read and a DTMF (Dual Tone Multi-Frequency) signal corresponding to the ID number is transmitted to the telephone company. The telephone company thus checks whether the transmitted ID number is registered as a subscriber. If the transmitted ID number is determined to be correct, the telephone company sends back a dial tone representative of "Service OK" to the telephone apparatus. Upon hearing this dial tone, the user depresses the "FUNCTION" key T and the "SEND" key R. Then, the telephone company sends a voice "THANK YOU" to the user while connecting the telephone apparatus of the user to the remote destination telephone set for the first person A. In the above procedure, even if the ID number is depressed, the ID number is never displayed on the display section 23, and the telephone number for the first person A remains displayed. When the user has completed his call, the user depresses the "END" key P for completing the call for the person A. Further, in case the company determines that the transmitted ID number is not registered, the company sends a voice indicative of an erroneous ID number to the telephone apparatus without connecting the circuits to other telephone sets.

Figure 3:
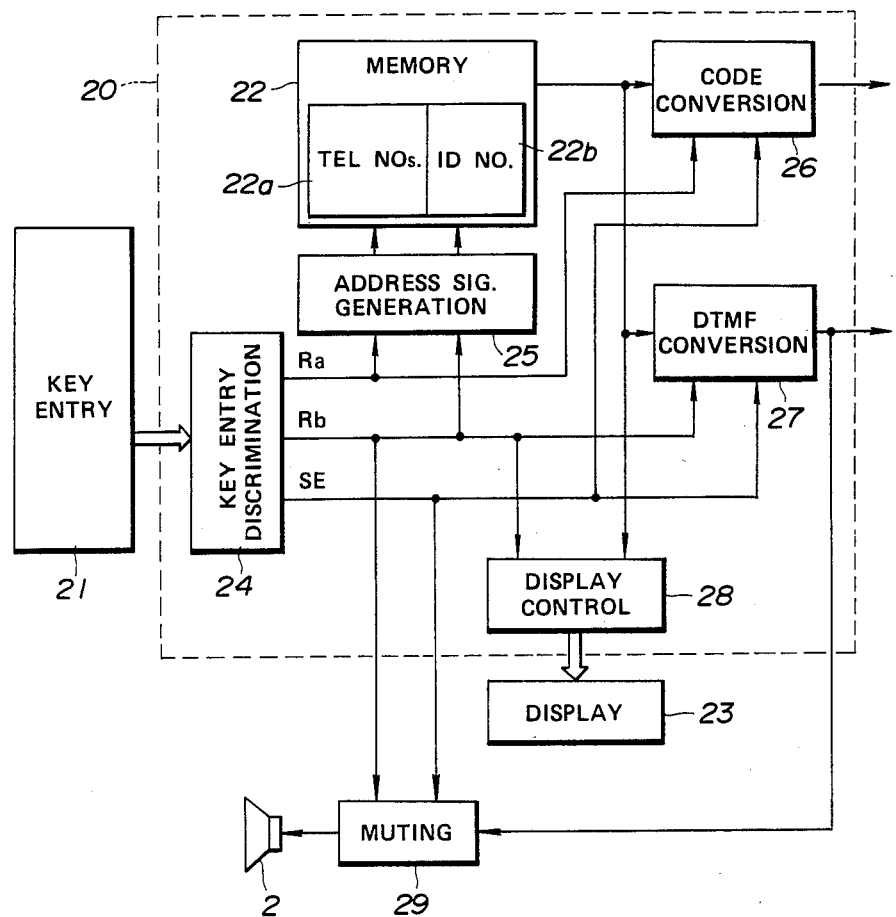
FIG. 3 is a schematic block diagram showing an exemplary section of the apparatus for implementing the present invention.
Figure 4:
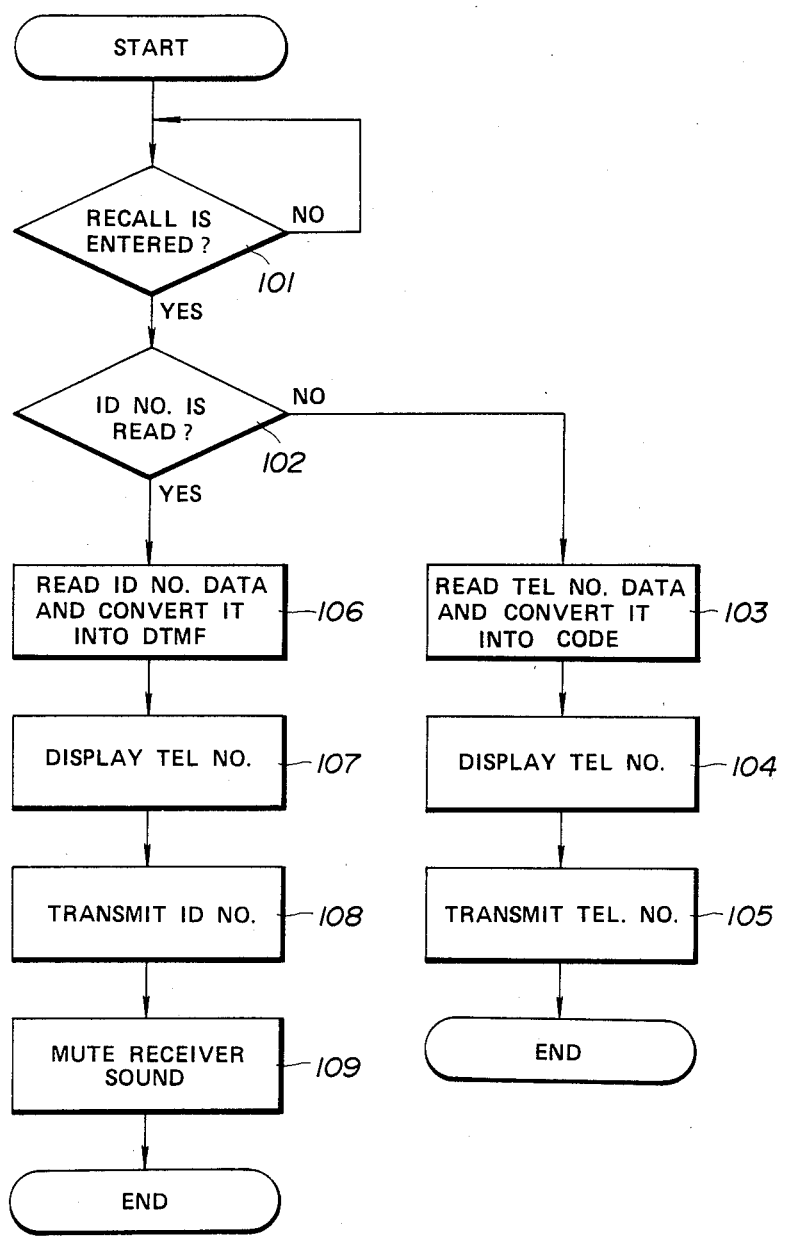
FIG. 4 is a flowchart showing an exemplary control procedure of the apparatus of the present invention.

FIG. 3 shows a block diagram of the essential sections of the telephone apparatus according to the present invention and FIG. 4 shows the flowchart of the operation of the apparatus shown in FIG. 2.

In FIG. 3, the apparatus comprises a control section 20, a key entry section 21, a display section 23, a muting section 29, a speaker 2, and so forth. The control section 20 includes a memory section 22 having a destination telephone number memory 22a and an ID number memory 22b, a key entry discrimination section 24 for discriminating which key of the key entry section 21 is depressed, an address signal generation section 25, a code conversion section 26 for converting telephone numbers into coded signals, a DTMF conversion section 27 for converting an ID number into a DTMF (Dual Tone Multi-Frequency) signal, and a display control section 28.

The above control section 20 can be realized by use of a microcomputer which is commercially available from Sharp Corp. under the designation 8-bit microcomputer LH-5080 (Trade Mark) for instance. The display section 23 can be formed by a liquid crystal, for instance.

The operation of the apparatus shown in FIG. 3 will be described with reference to the flowchart shown in FIG. 4.

In step 101, control first checks whether there exists a read instruction to the memory section 22. This check can be implemented by the key entry discrimination section 24 which discriminates whether the "RECALL" key S is depressed or not in the key entry section 21.

In step 102, control discriminates whether the data to be read from the memory section 22 is a telephone number or the ID number. This check can also be implemented by the key entry discrimination section 24 which also discriminates whether the "ID" key V is depressed or not in the key entry section 21.

If the ID number is not required to be read but a telephone number is required to be read, control proceeds to step 103. The key entry discrimination section 24 applies a telephone number read signal Ra to the address signal generation section 25. In response to this signal Ra, the address signal generation section 25 applies an address designation signal corresponding to the key entry (the digit of "1" is depressed for the first person A) to the telephone number memory section 22a, so that data representative of the required telephone number of ten digits is read from the telephone number memory section 22a and then converted into a coded signal by the code conversion section 26.

In step 104, the read data representative of the telephone number of ten digits are supplied to the display control section 28 and displayed on the display 23.

In step 105, if the "SEND" key R is depressed in the key entry section 21, the key entry discrimination section 24 outputs a data transmit signal $S_E$ to the code conversion section 26, so that the output gate of the section 26 is opened to transmit the coded signal of the telephone number to the telephone company through the telephone line.

On the other hand, in step 102, if control determines that the "ID" key V is depressed in the key entry section 21 to read the ID number, control proceeds to step 106. The key entry discrimination section 24 applies an ID number read signal $R_b$ to the address signal generation section 25. In response to this signal $R_b$, the address signal generation section 25 applies an address designation signal corresponding to the ID number to the ID number memory section 22b, so that data representative of the ID number of fourteen digits are read from the ID number memory section 22b and then converted into a DTMF signal by the DTMF conversion section 26. In this case, although the read data representative of the ID number are supplied to the display control section 28, the display control section 28 does not display the ID number on the display 23 in response to the ID number read signal $R_b$ applied from the key entry discrimination section 24 thereto. Therefore, the destination telephone number is kept displayed.

In step 108, if the "SEND" key R is depressed in the key entry section 21, the key entry discrimination section 24 outputs a data transmit signal $S_E$ to the DTMF conversion section 27, so that the output gate of the section 27 is opened to transmit the DTMF signal representative of the ID number to the telephone company through the telephone line for confirmation of the ID number.

Further, in step 109, the ID number read signal $R_b$ and the data transmit signal SE are both applied to the muting section 29 simultaneously, so that the DTMF signal representative of the ID number will not be reproduced through the speaker 2 of the handset 1, that is, it is possible to prevent the ID number from been heard by another person.

In the above embodiment, while the ID number is read, a read destination telephone number is displayed. However, without being limited to the display of the destination telephone number, it is also possible to display other marks such as "CALLING" or "CARD" or "C" or nothing.

Further, in this embodiment, the muting section 29 is incorporated within the apparatus so as not to reproduce the read DTMF signal through the speaker 2 of the handset. However, without being limited to the muting section 29, it is also possible to incorporate an oscillator, in place of the muting circuit, so as to generate a single sound common with the DTMF signals corresponding to the plural dial keys through the speaker 2 of the handset 1.

The above embodiment has been explained when applied to the ATT system, by way of example. However, the telephone apparatus according to the present invention can of course be applied to other systems of different telephone companies such as MCI system, SPRINT system, and so forth.

As described above, in the telephone apparatus according to the present invention, when the ID number for the subscriber is being read to transmit the read ID number to the telephone company for calling someone, since the subscriber's ID number is never displayed, it is possible to keep the ID number secret from another person.

While the present invention has been disclosed in terms of the preferred embodiment of the invention in order to facilitate a full understanding of the invention, it should be appreciated that the present invention should not be limited to the specific embodiment illustrated above. Various embodiments and modifications of the shown embodiment are possible. Therefore, the present invention should be understood as including all possible embodiments and modifications which do not depart from the principles of the invention set forth in the appended claims.

What is claimed is:

1. A telephone apparatus used for a telephone system in which the telephone apparatus is connected to a remote destination telephone through telephone circuits after an identification number for a subscriber has been transmitted to a telephone company, which comprises:
   (a) key entry means including plural dial keys;
   (b) memory means for storing the identification number and a plurality of remote destination telephone numbers both entered through the dial keys;
   (c) display means for displaying a remote destination telephone number corresponding to an operated dial key; and
   (d) control means for enabling a display of the identification number to be displayed on said displaying means when the identification number is written at a designated address of said memory means but disabling a display of the identification number on said displaying means when the identification number is read from the designated address of said memory means to transmit the number to the telephone company.

2. The telephone apparatus as set forth in claim 1, wherein the identification number is converted into a dual tone multi-frequency (DTMF) signal before being transmitted to the telephone company and further the converted signal representative of the identification number is muted without reproducing the converted signal through a speaker of the telephone apparatus.

3. The telephone apparatus as set forth in claim 1, wherein the identification number is converted into a dual tone multi-frequency (DTMF) signal before being transmitted to the telephone company and further a sound different from that corresponding to the dial keys of the key entry means is produced through a speaker of the telephone apparatus.

* * * * *